United States Patent
Eloy

(10) Patent No.: US 10,261,720 B2
(45) Date of Patent: Apr. 16, 2019

(54) METHOD FOR OPTIMIZING THE USE OF A NON-VOLATILE MEMORY IN A MOTOR VEHICLE COMPUTER FOR MONITORING A FUNCTIONAL MEMBER

(71) Applicants: CONTINENTAL AUTOMOTIVE FRANCE, Toulouse (FR); CONTINENTAL AUTOMOTIVE GMBH, Hannover (DE)

(72) Inventor: Stephane Eloy, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 237 days.

(21) Appl. No.: 14/889,887

(22) PCT Filed: May 30, 2014

(86) PCT No.: PCT/EP2014/001501
§ 371 (c)(1),
(2) Date: Nov. 9, 2015

(87) PCT Pub. No.: WO2014/195012
PCT Pub. Date: Dec. 11, 2014

(65) Prior Publication Data
US 2016/0117132 A1    Apr. 28, 2016

(30) Foreign Application Priority Data
Jun. 6, 2013 (FR) .................... 13 55226

(51) Int. Cl.
*G06F 3/06* (2006.01)
*G07C 5/08* (2006.01)
*G06F 11/14* (2006.01)

(52) U.S. Cl.
CPC .......... *G06F 3/0653* (2013.01); *G06F 3/0604* (2013.01); *G06F 3/0673* (2013.01); *G06F 11/1417* (2013.01); *G07C 5/08* (2013.01)

(58) Field of Classification Search
CPC .... G06F 3/0619; G06F 3/0653; G06F 3/0604; G06F 3/0673; G06F 11/1417;
(Continued)

(56) References Cited

U.S. PATENT DOCUMENTS 7,100,080 B2    8/2006   Howe
7,188,225 B1    3/2007   Therene et al.
(Continued)

FOREIGN PATENT DOCUMENTS

EP    2 345 904 A1    7/2011
FR    2 830 667 A1    4/2003
(Continued)

OTHER PUBLICATIONS

International Search Report, dated Aug. 14, 2014, from corresponding PCT application.

*Primary Examiner* — Michael Krofcheck
(74) *Attorney, Agent, or Firm* — Young & Thompson

(57) ABSTRACT

A method for optimizing the use of the non-volatile memory of a motor vehicle computer, used for monitoring a functional member of the vehicle by the computer which is programmed to carry out in the course of a given cycle, during the wake-up thereof, a start-up monitoring stage, and before being put into sleep mode, a shut-down monitoring stage, the computer including a standard counter suitable to be stored in a standard unit and an on-the-fly counter suitable to be stored in an on-the-fly unit, the method including the steps of:
incrementing the on-the-fly counter in order to identify a potential malfunction of the monitored functional member;

(Continued)

Figure 1:
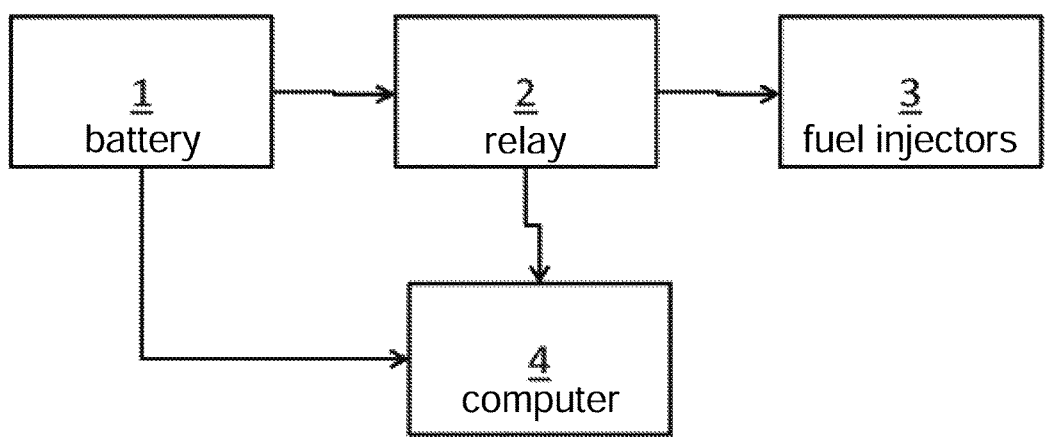

comparing the on-the-fly counter with the standard counter in the course of a next monitoring stage of the computer; and generating information representing a malfunction in the case of detecting a deviation between the counters.

17 Claims, 3 Drawing Sheets

(58) Field of Classification Search
CPC ............. G06F 11/1441; G06F 12/0804; G06F 12/0815; G06F 12/0866; G06F 12/0868; G07C 5/08
See application file for complete search history.

(56) References Cited

U.S. PATENT DOCUMENTS 9,229,870 B1 * 1/2016 Kumar ................ G06F 12/0868

| | | | |
|---|---|---|---|
| 2003/0212921 A1 | 11/2003 | Howe | |
| 2006/0259209 A1 * | 11/2006 | Sugimura | .......... G01R 31/3278 701/1 |
| 2007/0115604 A1 * | 5/2007 | Zettel | ................ G01R 31/3278 361/160 |
| 2008/0086586 A1 | 4/2008 | Ogawa et al. | |
| 2008/0197809 A1 | 8/2008 | Ho et al. | |
| 2011/0199115 A1 * | 8/2011 | Iida | ........................ B60L 3/0046 324/764.01 |
| 2011/0258486 A1 * | 10/2011 | Bhogal | ............... G06F 11/1438 714/15 |
| 2014/0025996 A1 | 1/2014 | Eloy | |

FOREIGN PATENT DOCUMENTS

FR 2830667 A1 4/2003
FR 2 993 669 A1 1/2014

* cited by examiner

METHOD FOR OPTIMIZING THE USE OF A NON-VOLATILE MEMORY IN A MOTOR VEHICLE COMPUTER FOR MONITORING A FUNCTIONAL MEMBER

BACKGROUND OF THE INVENTION

Field of the Invention

The present invention relates to a method for optimizing the use of the non-volatile memory of a motor vehicle computer, which is used for monitoring a functional member of said motor vehicle, for example, an electrical supply relay or a computer for monitoring said motor vehicle.

Description of the Related Art

A computer allows various members of the vehicle to be monitored. To this end, the computer must be powered electrically. To limit the consumption thereof, the latter is put into sleep mode when the vehicle is not used and woken when the vehicle is about to be used. Therefore, conventionally, a computer is programmed to carry out, during the wake-up thereof, a start-up monitoring stage, and before being put into sleep mode, a shut-down monitoring stage.

Therefore, conventionally, a life cycle is defined for a computer, which life cycle comprises a start-up monitoring stage, a usage nominal stage and a shutdown monitoring stage.

A computer is conventionally powered by a battery. In the case of malfunction of said battery or of the electrical circuit, cut-offs in the electrical supply of the computer can arise which resets the computer in an untimely manner.

The application FR1256982 of 19 Jul. 2012 in the names of the applicants describes a method for diagnosing a mechanism of untimely cut-offs of the electrical supply of a computer. The diagnosing method consists, at each start-up monitoring stage, in generating and storing, in a memory, a warning marker, and, during each shutdown monitoring stage, in checking the existence of the warning marker in order to determine if the latter has not been replaced, in the meantime, by a good operation marker stored during the absence of an untimely cut-off.

In other words, during a life cycle with no untimely cut-off, the diagnosing method requires a write during the start-up and a write during the shutdown at each cycle of the computer, i.e. two memory writes.

Conventionally, the memory of a computer is a non-volatile memory including a determined number of memory blocks, each memory block including a determined number of standard units and a single on-the-fly unit of reduced size compared to a standard unit.

During use of the memory, the memory blocks are used one after another. A change of memory block only occurs when the previous memory block is complete. A memory block is considered to be complete if all of the standard units of said memory block are full or if the single on-the-fly unit of said memory block is full.

In the diagnosing method set out above, all of the writes are carried out in the on-the-fly unit of a memory block. Indeed, the on-the-fly unit offers great flexibility and can be written "on the fly" unlike a standard unit which can only be written during determined stages of the lifecycle of the computer which presents a disadvantage with respect to monitoring a random malfunction.

As a result, the on-the-fly unit of a memory block can be filled after a limited number of life cycles of the computer whereas standard units remain available in the memory block. Filling is all the more quick since the storage capacity of an on-the-fly unit is reduced.

Such a use of the non-volatile memory of the computer consumes a large number of memory blocks which presents a disadvantage given that a memory includes a limited number of memory blocks. When the memory of the computer is filled, it is necessary to replace the computer which gives rise to constraints. The aim of the present invention is, principally, to overcome this disadvantage.

SUMMARY OF THE INVENTION

More precisely, the invention relates to a method for optimizing the use of the non-volatile memory of a motor vehicle computer, which is used for monitoring a functional member of said motor vehicle by said one computer of said vehicle, said computer being programmed to carry out in the course of a given cycle, during the wake-up thereof, a start-up monitoring stage, and before being put into sleep mode, a shut-down monitoring stage, said computer further including a memory including a plurality of memory blocks, each memory block comprising a plurality of standard units and an on-the-fly unit, said computer including a standard counter suitable to be stored in a standard unit and an on-the-fly counter suitable to be stored in an on-the-fly unit, the method comprising:
  a step of setting the on-the-fly counter and the standard counter to the same value;
  a step of incrementing the on-the-fly counter in order to identify a potential malfunction of said monitored functional member;
  a step of writing said incremented on-the-fly counter to the on-the-fly unit of a memory block in the course of a monitoring stage of the computer;
  a step of comparing said on-the-fly counter with the standard counter in the course of the next monitoring stage of the computer; and
  a step of generating information representing a malfunction in the case of detecting a deviation between said counters.

The monitoring, itself, of a functional member of a motor vehicle by a computer of said vehicle, and the detection of a malfunction are known to a person skilled in the art and will not be described in greater detail herein.

Thanks to the on-the-fly counter, any malfunction is recorded "on the fly" in the memory of the computer. The standard counter allows the use of the memory unit to be limited in order to increase the lifespan of the computers. By comparing the counters, it is reliably determined if a malfunction of a functional member has been recorded.

Furthermore, the use of a counter allows for traceability of the malfunctions monitored by a computer.

Preferably, the method comprises a step of incrementing the standard counter such as to be equal to the on-the-fly counter and a step of writing the standard counter to a standard unit of a memory block.

Incrementing the standard counter advantageously allows the generation of information representing a malfunction to be inhibited.

More preferably, the standard counter is written to the memory prior to the comparison step.

Preferably, the standard counter is written in the course of a shutdown monitoring stage of the computer which allows confirmation that the nominal stage took place normally.

It is preferred that the on-the-fly counter is written in the course of a start-up monitoring stage of the computer.

Therefore, the on-the-fly counter allows any potential dysfunction which can occur in the course of the nominal stage to be anticipated.

According to an aspect of the invention, the comparison step is carried out in the course of a start-up monitoring stage of the computer such as to determine if a malfunction has occurred in the course of the previous life cycle.

Preferably, the computer monitors untimely cut-offs of said computer.

According to an aspect of the invention, the on-the-fly counter is written in the course of a shutdown monitoring stage of the computer. Therefore, any malfunction which has occurred after the standard counter write step can be recorded in the memory.

Preferably, the standard counter is written to the memory after the comparison step such as to reset the monitoring.

It is preferred that, since the vehicle includes an electrical supply relay, the computer monitors a malfunction of said relay.

BRIEF DESCRIPTION OF THE DRAWING FIGURES

Figure 2:
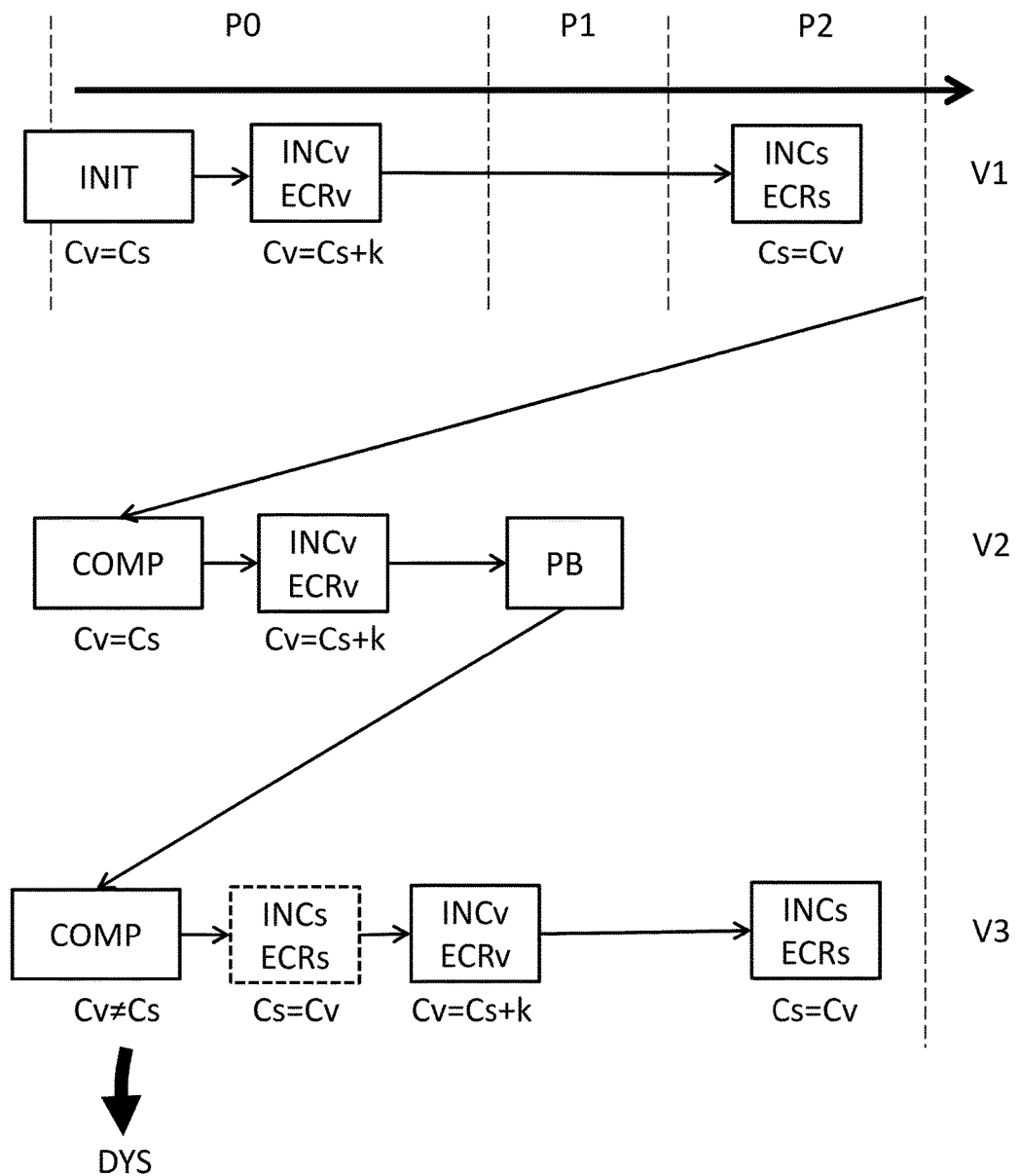
Figure 3:
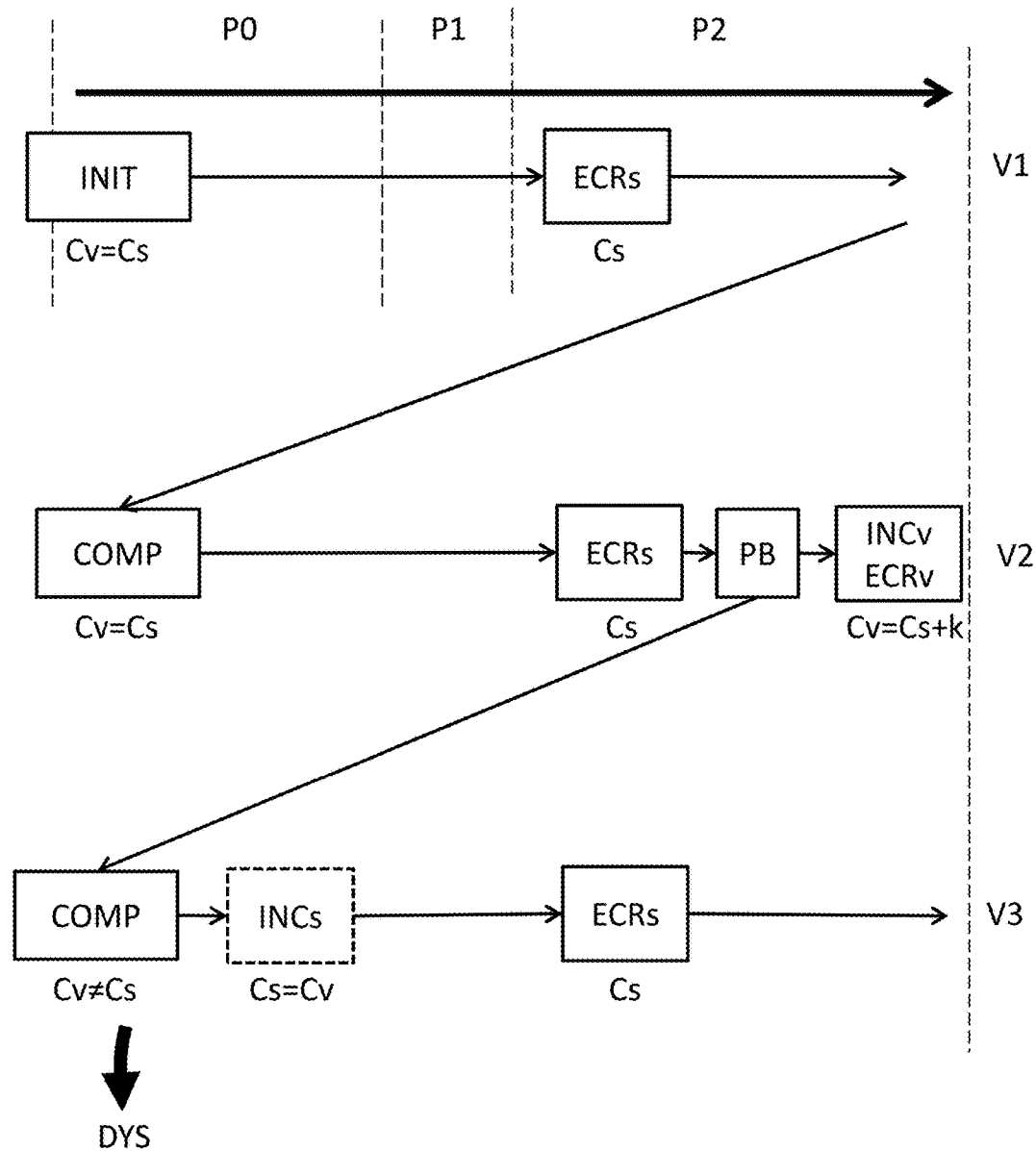

The invention will be better understood upon reading the following description, given solely by way of example, and with reference to the appended drawings wherein:

FIG. 1 is a schematic representation of an electrical supply circuit of a motor vehicle including a battery, an electrical relay, fuel injectors and a monitoring computer;

FIG. 2 is a schematic diagram of an example of implementing a method for optimizing the use of the non-volatile memory of a motor vehicle computer, which is used for monitoring untimely cut-offs of the monitoring computer; and FIG. 3 is a schematic diagram of an example of implementing a method for optimizing the use of the non-volatile memory of a motor vehicle computer, which is used for monitoring the electrical relay.

It should be noted that the figures disclose the invention in a detailed manner in order to carry out the invention, wherein said figures can, of course, be used to better define the invention if required.

DETAILED DESCRIPTION OF THE INVENTION

With reference to FIG. 1, a motor vehicle includes, in a known manner, an electrical supply circuit comprising a battery 1, normally having a voltage of approximately 12V, connected for example to fuel injectors 3, by means of an electrical relay 2 suitable for electrically disconnecting the fuel injectors 3 from the battery 1 in order to prevent the latter from running down in an undesired manner.

The electrical supply circuit further includes a monitoring computer 4, known to a person skilled in the art as an ECU (Electronic Control Unit). The monitoring computer 4, directly or indirectly connected to the battery 1, is configured to monitor malfunctions of elements of the supply circuit, in particular, untimely cut-offs of the electrical supply of the monitoring computer 4 and malfunctions of the relay of the supply circuit 2.

A method for diagnosing a mechanism of untimely cut-offs of the electrical supply of a motor vehicle computer is, for example, described in the French patent application FR 1256982.

A method of diagnosing an operating fault of a supply relay of a motor vehicle computer is, for example, described in the French patent application FR 1257807.

The invention will be set out in a detailed manner for the monitoring of untimely cut-offs of the electrical supply of the monitoring computer 4, then a use of the invention for monitoring a malfunction of the relay of the supply circuit 2 will be set out.

In a known manner, a monitoring computer 4 is suitable to be put into sleep mode in order to limit the consumption thereof, then woken up during the vehicle use stages. The awake stage of a monitoring computer 4 is called the "life stage".

In the course of the life stage thereof, with reference to FIGS. 2 and 3, the monitoring computer 4 is programmed to carry out, during the wake-up thereof, a start-up monitoring stage S0, then a usage nominal stage S1 and, before being put into sleep mode, a shutdown monitoring stage S2. The monitoring stages S0, S2, at start-up or at shutdown, are important since they allow vehicle information to be stored in a non-volatile memory of the computer 4 in order to be able to be used in the course the next life stage of the monitoring computer 4.

The non-volatile memory of the computer 4 includes a plurality of memory blocks, each memory block comprising a plurality of standard units and a single on-the-fly unit. As indicated in the preamble, during the use of the non-volatile memory, the memory blocks are used one after another. A change of memory block only occurs when the previous block is complete. A memory block is considered to be complete if all of the standard units of said memory block are full or if the on-the-fly unit of said memory block is full.

According to a preferred embodiment of the invention, the monitoring computer 4 includes a standard counter Cs suitable to be stored in a standard unit and an on-the-fly counter Co suitable to be stored in an on-the-fly unit.

Unlike the standard counter Cs which can only be written to memory in the course of a monitoring stage S0, S2 of the computer 4, the on-the-fly counter Co can be written to the on-the-fly unit at any time which allows a large degree of flexibility and better accuracy during monitoring as will be described in detail hereafter.

In a first embodiment, with reference to FIG. 2, the computer 4 monitors untimely cut-offs of said computer 4 which can, for example, occur in the course of the nominal use S1 thereof.

In the course of a first stage INIT, the standard counter Cs and the on-the-fly counter Co are set to the same value and recorded in a standard unit and an on-the-fly unit, respectively, of the memory block. It is preferred that the standard counter Cs and the on-the-fly counter Co are set to the value 0.

Still with reference to FIG. 2, in the course of a first life cycle L1 of the computer 4, the on-the-fly counter Co is incremented (step INCo) by an increment k such as to be different from the standard counter Cs. Preferably, the increment k is equal to 1 but, of course, it could have a different value.

The incrementation step INCo allows a potential malfunction of said computer 4 to be identified as will be described in detail hereafter. This incrementation step INCo is preferably carried out at the start of the life cycle of the computer 4, in a preferred manner, in the course of the start-up monitoring stage S0 as illustrated in FIG. 2.

The method comprises a step of writing WRIo said on-the-fly counter Co to the on-the-fly unit of the memory block in the course of the start-up monitoring stage S0.

In this embodiment, in the course of the normal use stage S1 of the first life cycle L1, the computer 4 is not subjected to a cut-off. Therefore, in the course of the shutdown monitoring stage S2, the method includes a step of incrementing INCs the standard counter Cs such as to be equal to the on-the-fly counter Co as illustrated in FIG. 2.

In the course of the shutdown monitoring stage S2, the method includes a step WRIs for writing the standard counter Cs to a standard unit of the memory block.

Therefore, in the absence of a malfunction, when the vehicle goes into sleep mode at the end of the first life cycle L1, the standard counter Cs and the on-the-fly counter Co are equal.

When the computer 4 wakes up, in the course of the second life cycle L2, the computer 4 carries out a step of comparing COMP the on-the-fly counter Co with the standard counter Cs in the course of the start-up monitoring stage S0. As the standard counter Cs and the on-the-fly counter Co are equal, no information representing a malfunction is generated.

After incrementing INCo and writing WRIo the on-the-fly counter Co in a similar manner to the first life cycle L1, an untimely cut-off PB occurs during the nominal stage S1 of the second life cycle L2 which stops the life cycle L2 thereof. In other words, the computer 4 cannot reach the shutdown monitoring stage S2 thereof as illustrated in FIG. 2. Therefore, the standard counter Cs and the on-the-fly counter Co are no longer equal.

When the computer 4 wakes up, in the course of the third life cycle L3, the computer 4 carries out a step for comparing COMP the on-the-fly counter Co with the standard counter Cs in the course of the start-up monitoring stage S0. As the standard counter Cs and the on-the-fly counter Co are not equal, information MAL representing a cut-off is generated. This information MAL can take various forms in order to be interpreted by the computer 4. In this example, the information MAL representing a cut-off is in the form of a visual warning on the dashboard of the vehicle.

Following the detection of the malfunction, in the course of the start-up monitoring stage S0 of the third life cycle L3, the method includes a step for incrementing INCs and writing WRIs the standard counter Cs such as to be equal to the on-the-fly counter Co. Then, in order to detect a new malfunction, the method includes a step for incrementing INCo and a step for writing WRIo the on-the-fly counter Co.

Therefore, in this implementation of the method for monitoring untimely cut-offs of the computer 4, the standard counter Cs is written WRIs to the memory prior to the comparison step COMP. Therefore, in the absence of a cut-off, the counters Cs, Co are rebalanced in order to inhibit any generation of information representing a malfunction.

Thanks to this monitoring method, only one on-the-fly unit is written per life cycle of the computer 4 which optimizes the use of the memory compared to the prior art which required at least two writes to the on-the-fly units. Given the number of life cycles of a computer 4 in the course of the life of a vehicle, the benefits for the memory are great. The lifespan of the computer 4 is therefore improved.

A second embodiment of the invention is described with reference to FIG. 3. The references used to describe the elements having a structure or function identical, equivalent or similar to those of the elements of FIG. 2 are the same, in order to simplify the description. Moreover, the entire description of the embodiment of FIG. 2 is not repeated, this description applying to the elements of FIG. 3 when there are no incompatibilities. Only the structural and functional notable differences are described. Potential malfunction means, in this example, a malfunction that is detected but, for example, not confirmed, this detection being determined after the write stage for the standard units, which is the instant of the conventional storage of the malfunctions of a motor vehicle.

In this second embodiment, with reference to FIG. 3, the computer 4 monitors malfunctions of the electrical supply relay 2 which can, for example, occur in the course of the shutdown of the computer 4. By way of example, the electrical relay 2 does not cut out when the vehicle is put into standby mode which leads to an electrical consumption of the vehicle while it is not used. The supply to the computer can then continue. This stage is used to diagnose the malfunction of the supply relay.

In the course of a first step INIT, the standard counter Cs and the on-the-fly counter Co are set to the same value and recorded in a standard unit and an on-the-fly unit, respectively, of the memory block. It is preferred that the standard counter Cs and the on-the-fly counter Co are set to the value 0.

Still with reference to FIG. 3, in the course of a first life cycle L1 of the computer 4, the supply relay 2 is not subjected to any malfunction. When there is no malfunction, only the standard counter Cs is written during the first life cycle L1 of the computer 4 which saves the memory of said computer 4.

Therefore, when the vehicle goes into sleep mode at the end of a life cycle without a malfunction, the standard counter Cs and the on-the-fly counter Co are equal.

When the computer 4 wakes up, in the course of the second life cycle L2, the computer 4 carries out a step for comparing COMP said on-the-fly counter Co with the standard counter Cs in the course of the start-up monitoring stage S0. Since the standard counter Cs and the on-the-fly counter Co are equal, no information representing a malfunction is generated.

With reference to FIG. 3, in the course of the shutdown monitoring stage S2 of the second life cycle L2, the computer 4 detects that the supply relay 2 is not cut-off. The method includes a step for incrementing INCo and writing WRIo the on-the-fly counter Co. Preferably, the on-the-fly counter Co is incremented by an increment k such as to be different from the standard counter Cs. Preferably, the increment k is equal to 1 but, of course, it could have a different value.

Advantageously, the on-the-fly counter Co is written "on the fly" which allows a fault to be recorded subsequent to writing the standard counter Cs.

Therefore, the standard counter Cs and the on-the-fly counter Co are no longer equal at the end of the second life cycle L2 which allows a potential malfunction MAL to be identified.

When the computer 4 wakes up, in the course of the third life cycle L3, the computer 4 carries out a step of comparing COMP said on-the-fly counter Co with the standard counter Cs in the course of the start-up monitoring stage S0. Since the standard counter Cs and the on-the-fly counter Co are not equal, information representing a malfunction MAL of the supply relay 2 is generated. This information MAL can take various forms in order to be interpreted by the computer 4.

Following the detection of the malfunction, in the course of the start-up monitoring stage S0 of the third life cycle L3, the method includes an incrementation step INCs such as to be equal to the on-the-fly counter Co. In other words, the incrementation step INCs allows the monitoring of a malfunction to be reset.

Advantageously, when the increment k is equal to 1, the value of the standard counter Cs corresponds to the detected malfunction number. Moreover, the difference between the standard counter Cs and the on-the-fly counter Co allows the number of consecutive malfunctions to be determined.

Therefore, in this implementation of the method for monitoring a malfunction of the supply relay 2, the standard counter Cs is written WRIs to the memory after the comparison step COMP.

In a manner similar to the first embodiment, this embodiment of the invention optimizes the use of the memory, by calling upon the on-the-fly unit to a lesser extent, and improves the lifespan of the computer 4.

The invention claimed is:

1. A method implemented by a motor vehicle computer for monitoring a functional member of said motor vehicle, the method comprising:
carrying out, via a program executed by said computer that includes a non-volatile memory constituted by a plurality of memory blocks each having a plurality of standard units and an on-the-fly unit, the on-the-fly unit differing from the standard units in that the on-the-fly unit can be written any time whereas the standard units can only be written during determined stages of the lifecycle of the computer, steps of:
setting an on-the-fly counter and a standard counter to a same value;
incrementing the on-the-fly counter in order to identify a potential malfunction of said monitored functional member;
writing said incremented on-the-fly counter to the on-the-fly unit of a memory block of said memory blocks in a course of a monitoring stage of the computer;
comparing said on-the-fly counter with the standard counter in a course of a next monitoring stage of the computer;
determining whether a deviation exists between said on-the-fly counter and the standard counter;
in the event of a determination of a deviation between said on-the-fly counter and the standard counter, generating information representing a malfunction.

2. The method as claimed in claim 1, further comprising:
incrementing the standard counter so as to be equal to the on-the-fly counter; and
writing the standard counter to a standard unit of the memory block.

3. The method as claimed in claim 2, wherein the standard counter is written to the standard unit of the memory block prior to the comparing step.

4. The method as claimed in claim 3, wherein the standard counter is written to the standard unit of the memory block in the course of a shutdown monitoring stage of the computer.

5. The method as claimed in claim 2, wherein the standard counter is written to the standard unit of the memory block in a course of a shutdown monitoring stage of the computer.

6. The method as claimed in claim 2, wherein the on-the-fly counter is written to the on-the-fly unit of the memory block in a course of a start-up monitoring stage of the computer.

7. The method as claimed in claim 2, wherein the comparing step is carried out in a course of a start-up monitoring stage of the computer.

8. The method as claimed in claim 2, wherein the computer monitors untimely cut-offs of said computer.

9. The method as claimed in claim 2, wherein the on-the-fly counter is written in a course of a shutdown monitoring stage of the computer.

10. The method as claimed in claim 2, wherein the standard counter is written to the memory after the comparing step.

11. The method as claimed in claim 2, wherein the computer monitors a malfunction of an electrical supply relay of the vehicle.

12. The method as claimed in claim 1, wherein the on-the-fly counter is written to the on-the-fly unit of the memory block in a course of a start-up monitoring stage of the computer.

13. The method as claimed in claim 1, wherein the comparing step is carried out in a course of a start-up monitoring stage of the computer.

14. The method as claimed in claim 1, wherein the computer monitors untimely cut-offs of said computer.

15. The method as claimed in claim 1, wherein the on-the-fly counter is written to the on-the-fly unit of the memory block in a course of a shutdown monitoring stage of the computer.

16. The method as claimed in claim 1, wherein the standard counter is written to the standard unit of the memory block after the comparing step.

17. The method as claimed in claim 1, wherein the computer monitors a malfunction of an electrical supply relay of the vehicle.

* * * * *